United States Patent

[11] 3,598,242

[72] Inventor Lambert H. Mott
c/o Mott Metallurgical Corp., P.O. Drawer "L", Farmington Industrial Park, Farmington, Conn.
[21] Appl. No. 886,546
[22] Filed Dec. 19, 1969
[45] Patented Aug. 10, 1971

[54] MULTIPLE ELEMENT FILTER FOR POLYMERS
5 Claims, 5 Drawing Figs.

[52] U.S. Cl. .................................................. 210/323, 210/456
[51] Int. Cl. ............................................... B01d 29/24
[50] Field of Search ..................................... 210/323, 456

[56] References Cited
UNITED STATES PATENTS
3,170,873  2/1965  May .......................... 210/456 X
3,362,535  1/1968  Kasten ........................ 210/323 X Primary Examiner—Frank A. Spear, Jr.
Attorney—Peter L. Tailer ABSTRACT: A high differential pressure filter with a large filter area has a base plate containing threaded apertures over which there is secured a bundle of perforated tubes fixed together in a hexagonal pattern. Each perforated tube has a capped porous metal tube with a threaded base inserted therein and screwed into the base plate. The threaded base has an angular channel therethrough allowing each porous tube to be tightened into the base plate by a wrench inserted from below into the channel. A collector plate is fixed below the base plate and a filter body is disposed about the tube bundle so that viscous material introduced into the filter body passes through the perforated tubes and the porous tubes to be gathered in the collector plate.

INVENTOR:
LAMBERT H. MOTT
BY Peter L. Tailer
ATTORNEY

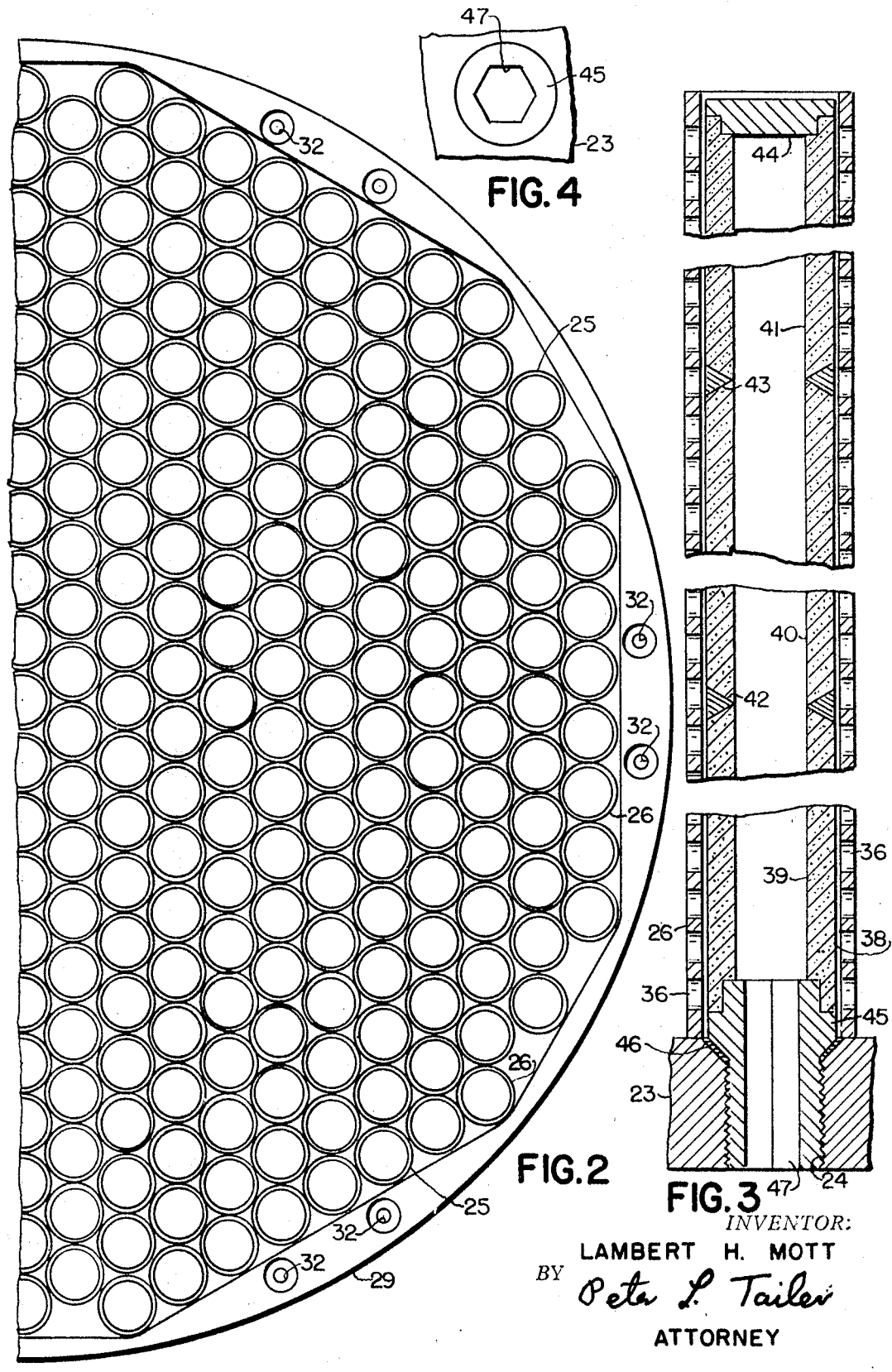

MULTIPLE ELEMENT FILTER FOR POLYMERS

BACKGROUND OF THE INVENTION

Synthetic polymers must be filtered to the highest purity at large pressure differentials. It is desirable to provide a filter with a large filtration area compared with its volume. This filter should withstand distortion, particularly when filling. It should also be easily disassembled for cleaning and have a minimum volume within the filter body to reduce polymer residence time and prevent polymer degradation during the filtering process. This invention provides a superior filter for synthetic polymers.

BRIEF DESCRIPTION OF THE DRAWING

FIG. 2 is a top view of a broken away one half of a perforated tube bundle within a lower bracket;

FIG. 3 is a longitudinal, vertical section through a fragment of a base plate with a perforated tube disposed thereover and a porous tube fixed therein, central portions of the tubes being broken away;

FIG. 4 is a bottom view of the fragment of the base plate shown in FIG. 3; and

DESCRIPTION OF THE PREFERRED EMBODIMENT

Figure 1:
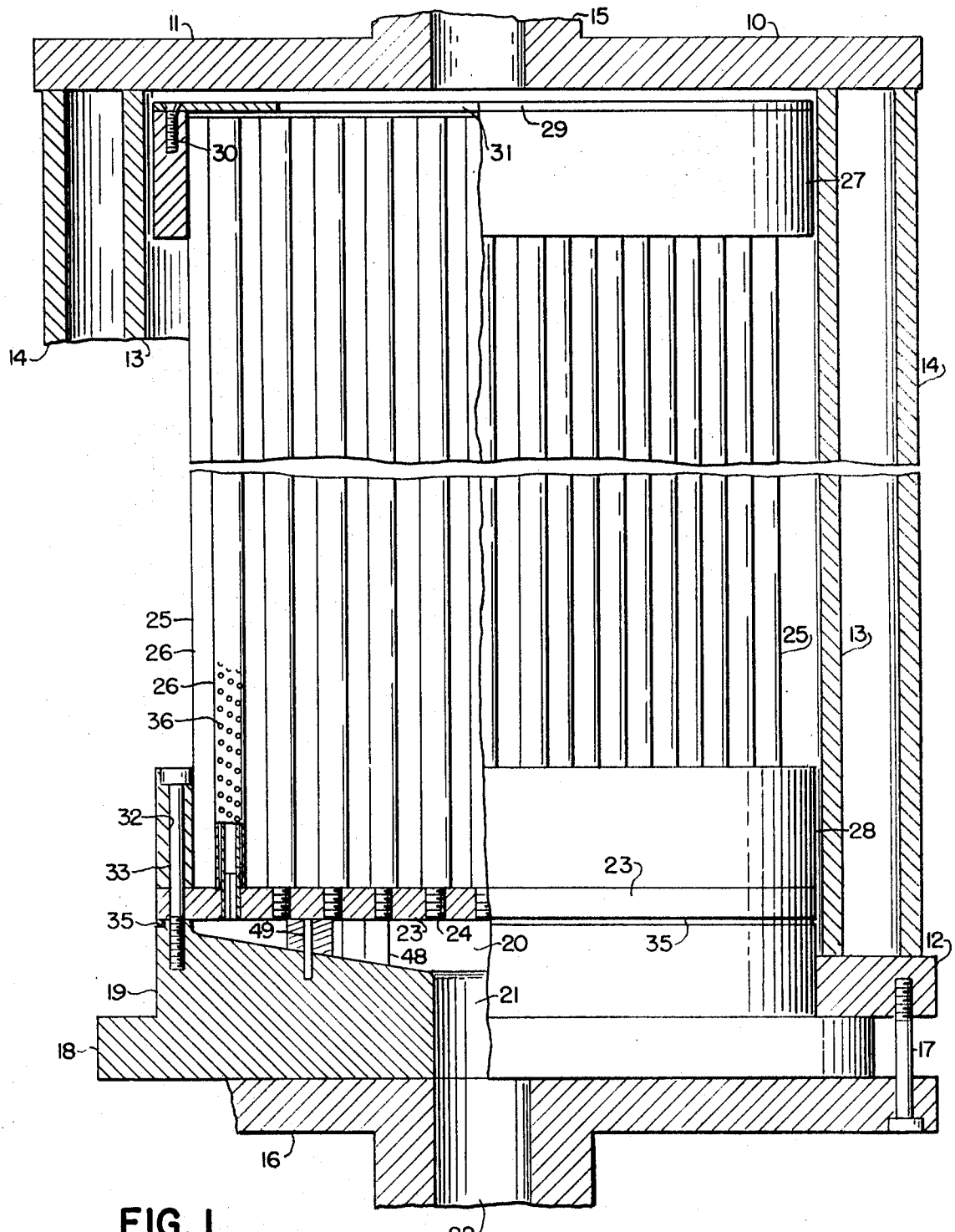
FIG. 1 is a longitudinal, vertical section through a filter case with a portion broken away and with a tubular filter shown therein having one half broken away in section.
Figure 5:
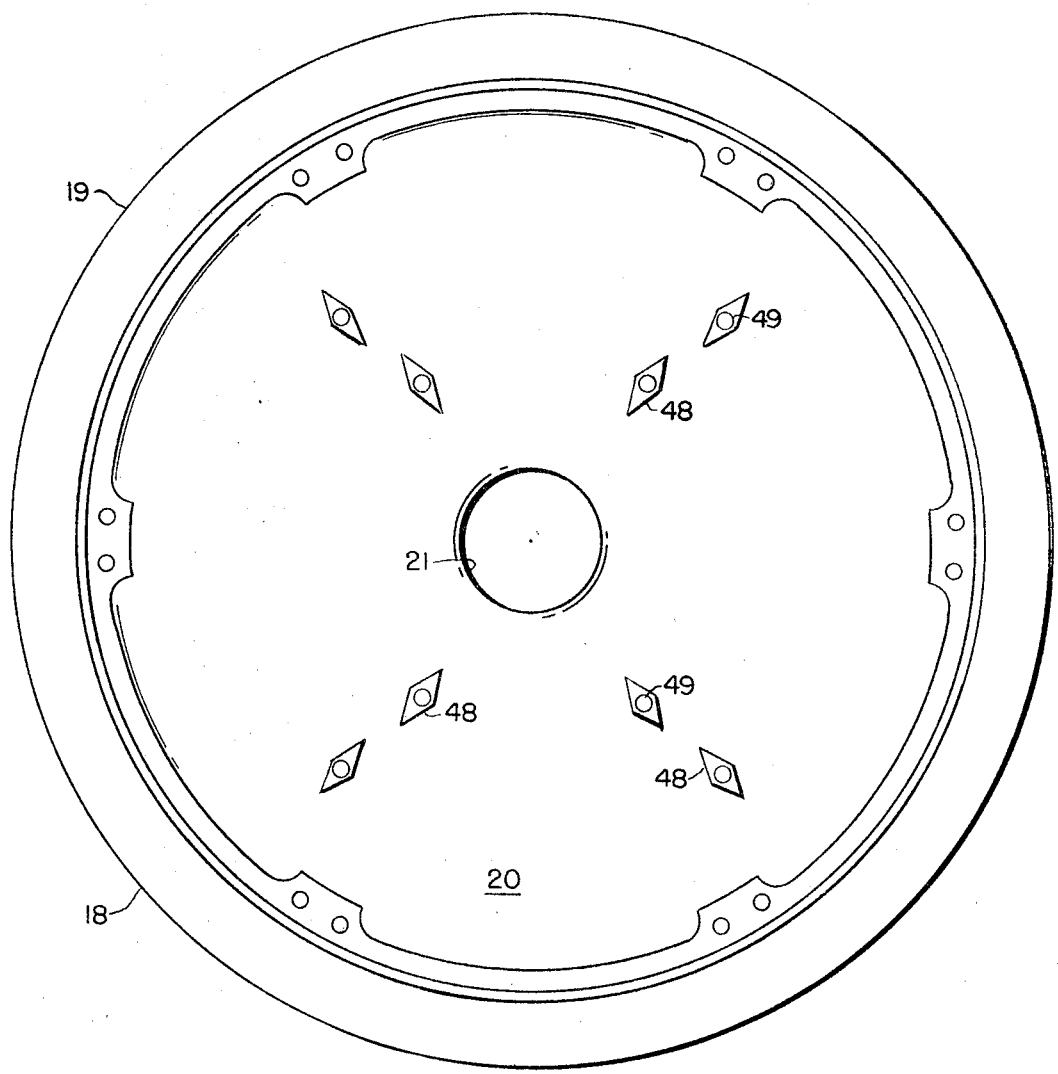
FIG. 5 is a top view of a collector plate.

Referring to the Drawing, the filter of this invention has a casing 10 with upper and lower flanges 11 and 12 between which there extends the inner cylindrical wall 13 and the outer jacket 14. A heating fluid is passed through jacket 14 to provide the temperature required for a given polymer being filtered. Flange 11 contains an entrance pipe 15. Flange 12 has a lower plate 16 secured below it by bolts 17 to clamp the flange 18 of collector plate 19 therebetween.

Collector plate 19 contains a cavity 20 which slopes downward to the central opening 21 to communicate with the outlet passage 22. Disposed over cavity 20 is the base plate 23 containing a hexagonal array of threaded apertures 24.

As may be seen in FIGS. 2 and 3, a bundle 25 of perforated tubes 26 is formed by assembling the tubes 26 and tack welding their upper ends and their lower ends at points of intersection. The ends of bundle 25 may then be ground and the upper and lower brackets 27 and 28 welded in place about it. Upper bracket 27 may have a cover 29 fixed over it by screws 30. Cover 29 is fixed a spaced distance from the ends of the tubes 26 and it contains the large central opening 31.

Lower bracket 28 contains the apertures 23 to accommodate the bolts 33 which secure the bundle 25 over base plate 23 and secure the base plate 23 to collector plate 19. A copper wire O-ring 35 or other suitable gasketing may be provided. Each tube 26, containing the perforations 36, is disposed over a threaded aperture 24. In assembly, a porous metal tube 38 is inserted in each perforated tube 26 and hand tightened in base plate 23.

As shown in FIG. 3, each porous tube 38 may be made up of lengths 39, 40 and 41 welded together at 42 and 43 and closed at its upper end by a cap 44. Threaded tube adapters 45 are fixed to the lower ends of the porous tubes 38 to be turned into the array of threaded apertures 24. Chamfers are provided to receive the conical gaskets 46. The through passage 47 in each adapter 45 is hexagonal to receive an allen wrench so that the porous tubes 38 may be tightened in bottom plate 23 from below before the bottom or base plate 23 is fixed over collector plate 19. The cavity 20 in collector plate 19 contains supports 48 secured in place by pins 49 to brace base plate 23 against the extreme pressures to which it is subjected. Cavity 20 has a fine finish to assist flow therethrough.

In several examples of this invention, it has been found that porous stainless steel filter tubes 38 with a wall diameter of about one sixteenth inch and an outside diameter of 0.405 inch could withstand a minimum pressure differential of 6,500 p.s.i. without failure. This is much greater than any comparable large area filter. The perforated tube bundle 25 confines each porous tube 38 to a maximum deflection of the same amount as the clearance between tubes 26 and 38 which is less than one sixteenth inch in all cases. The tubes 26 may be up to 60 or more inches in length. The area of the perforations 36 in the tubes 26 may amount to as much as one half their surface area.

The hexagonal pattern of the tubes 26 of bundle 25 imparts a terrific strength and resistance to distortion, particularly during the filling of the casing when the highly viscous polymer tends to force the porous tubes 38 toward the center as it fills the cavity. Further, the perforated tube bundle 25 takes up space within the filter case 10 to drastically reduce the residence time of the polymer within the filter. This greatly reduces the possibility of polymer degradation during the filtering process. Additionally, the perforated tube bundle 25 serves to more uniformly distribute the polymer within the filter case 10 thus insuring a better temperature distribution, loading, and flow through individual tubes. The flow path through the individual porous tubes 38 is superior to other filter construction as the flow travels in a more direct line. The direct flow path results in a lower pressure drop across the entire filter assembly. Depending on the need, porous tubes 38 may be provided to give a filtration rating from ½ to 100 microns. The particular filter structure set forth may also be more easily, quickly and inexpensively disassembled for solvent cleaning of the tubes 38. Filters of the type described have been built having from over 100 to over 400 tubes.

While this invention has been shown and described in the best form known, it will nevertheless be understood that this is purely exemplary and that modifications may be made without departing from the spirit of the invention.

What I claim is:

1. A filter for synthetic polymers comprising, in combination, a base plate containing a hexagonal array of threaded apertures, a bundle of perforated tubes contacting each other and being arranged in a hexagonal pattern over said base plate with one of said perforated tubes being disposed over each of said threaded apertures, a porous metal tube disposed with a clearance within each perforated tube, said porous metal tubes each having closed upper ends and threaded lower ends turned into said threaded apertures, a collector plate containing a cavity and an opening, said cavity sloping toward said opening, said collector plate being fixed below said base plate with said cavity disposed below said threaded apertures, and a filter body containing an inlet disposed closely about said bundle of perforated tubes.

2. The combination according to claim 1 wherein said threaded lower ends of said porous tubes are threaded tube adapters fixed to the lower ends of said porous tubes, said tube adapters containing angular channels therethrough to receive a wrench therein to tighten said porous tubes from below said base plate before said base plate is fixed on said collector plate.

3. The combination according to claim 2 wherein a bracket is disposed about the lower end of said bundle, said bracket and said base plate containing apertures, and with the addition of bolts passing through said apertures securing said bracket and thereby said bundle to said base plate and said base plate to said collector plate.

4. The combination according to claim 3 wherein said perforated tubes are tack welded together at their upper and lower ends, said bracket being welded to said bundle.

5. The combination according to claim 4 wherein said bundle is substantially cylindrical and said filter body is substantially cylindrical and disposed closely about said bundle.